United States Patent
Doering et al.

(10) Patent No.: US 7,426,902 B1
(45) Date of Patent: Sep. 23, 2008

(54) SORBENT AND APPLICATIONS

(75) Inventors: Alan R. Doering, Good Thunder, MN (US); Jack E. Johnson, Waseca, MN (US); Charanjeet Kaur Wadhawan, Grand Forks, ND (US)

(73) Assignee: Agricultural Utilization Research Institute, Crookston, MN (US)

( * ) Notice: Subject to any disclaimer, the term of this patent is extended or adjusted under 35 U.S.C. 154(b) by 203 days.

(21) Appl. No.: 11/136,910

(22) Filed: May 24, 2005

Related U.S. Application Data

(60) Provisional application No. 60/574,026, filed on May 24, 2004.

(51) Int. Cl.
*A01K 1/01* (2006.01)

(52) U.S. Cl. ..................................... 119/171

(58) Field of Classification Search ................ 119/171, 119/172, 173
See application file for complete search history.

(56) References Cited

U.S. PATENT DOCUMENTS

| | | | |
|---|---|---|---|
| 3,983,842 A | 10/1976 | Marion et al. |
| 4,206,718 A | 6/1980 | Brewer |
| 4,217,858 A | 8/1980 | Dantoni |
| 4,258,660 A | 3/1981 | Pris et al. |
| 4,727,824 A | 3/1988 | Ducharme et al. |
| 4,883,021 A | 11/1989 | Ducharme et al. |
| 5,021,390 A | 6/1991 | Hatton |
| 5,041,410 A | 8/1991 | Ivie |
| 5,067,984 A | 11/1991 | Starr |
| 5,109,804 A | 5/1992 | Chikazawa |
| 5,152,250 A | 10/1992 | Loeb |
| 5,207,830 A | 5/1993 | Cowan et al. |
| 5,209,185 A | 5/1993 | Chikazawa |
| 5,215,041 A | 6/1993 | Krahenbuhl |
| 5,216,980 A | 6/1993 | Kiebke |
| 5,219,818 A | 6/1993 | Ivie |
| 5,229,348 A | 7/1993 | Ivie |
| 5,230,305 A | 7/1993 | House |
| 5,266,547 A | 11/1993 | Wollrich |
| 5,361,719 A | 11/1994 | Kiebke |
| 5,448,967 A | 9/1995 | Ryan |
| 5,526,770 A | 6/1996 | Kiebke |
| 5,605,114 A | 2/1997 | Peltenburg et al. |
| 5,690,052 A | 11/1997 | Sladek |
| 5,801,116 A | 9/1998 | Cottrell et al. |
| 5,975,018 A | 11/1999 | Otoguro |
| 6,014,947 A | 1/2000 | Sladek et al. |
| 6,098,569 A | 8/2000 | Kent et al. |
| 6,216,634 B1 | 4/2001 | Kent et al. |
| 6,220,206 B1 | 4/2001 | Sotillo et al. |
| 6,287,550 B1 | 9/2001 | Trinh et al. |
| 6,405,677 B2 | 6/2002 | Mcpherson et al. |
| 6,568,349 B1 | 5/2003 | Hughes et al. |
| 6,622,658 B2 | 9/2003 | Mcpherson et al. |
| 6,817,315 B1 | 11/2004 | Tsengas et al. |
| 6,868,802 B2 | 3/2005 | Mcpherson et al. |
| 2003/0004479 A1 | 1/2003 | Ueda et al. |
| 2003/0020043 A1 | 1/2003 | Barresi et al. |
| 2003/0205204 A1 | 11/2003 | Wang et al. |
| 2004/0086541 A1 | 5/2004 | Barresi et al. |
| 2004/0157734 A1 | 8/2004 | Mertens et al. |

OTHER PUBLICATIONS

"Nilex Tackifiers", Oct. 24, 2007, HTPP;//www.nilex.com/Products.aspx?ProductID=34, Nilex, 1 page.
Brett Carlson, "Tackifiers Put to the Test: Erosion and Sediment Control Comes to a Natural Conclusion", HTTP://www.landandwater.com/features/vol47no4/ 9 pages.
"Tack", HTTP://www.m-w.com/dictionary, 1 page.

*Primary Examiner*—Yvonne R. Abbott
(74) *Attorney, Agent, or Firm*—Albert W. Watkins

(57) ABSTRACT

A species of bean, *Phaseolus vulgaris* L., is pelleted, crumbled and sieved to a desired size. A sorbent produced therefrom has excellent sorbency and clumping, and is consequently well-suited for application as a scoopable animal litter. Alternative applications include, but are not limited to, industrial, commercial and residential sorbents, and high nitrogen content tackifiers suitable for hydro-seeding and other application.

13 Claims, No Drawings

SORBENT AND APPLICATIONS

CROSS REFERENCE TO RELATED APPLICATIONS

This application claims priority to U.S. provisional patent application 60/574,026 filed May 24, 2004 and having like title and inventorship, the contents which are incorporated herein by reference in entirety.

BACKGROUND OF THE INVENTION

1. Field of the Invention

This invention pertains generally to sorbents, and more specifically to bean cull manufacturing and utilization techniques which yield sorbents having many preferred characteristics. In one particularly preferred manifestation of the invention, small animal litters, such as are commonly used for cats and other small animals, are prepared from navy bean culls.

2. Description of the Related Art

As humans have become more technologically astute, a number of changes have swept through both home and industry. In an industrial setting, people regularly work with many chemicals and compounds in strengths and concentrations which either do not occur in nature, or which occur only infrequently. By using these modern techniques of processing and synthesizing, products which could not have been imagined only a few generations before are being manufactured or produced on a very consistent and reliable basis. People have, quite simply, learned much about how to synthesize, extract, concentrate, and combine various compounds and ingredients to better serve their needs.

As a by-product of these operations, there is a steadily growing need for improved ways of cleaning up from such operations, and better disposing of the wastes. Modern societies have evolved to include very dense populations, and the techniques used to clean up and dispose of the wastes will have a direct impact on how subsequent generations will be able to develop and utilize resources.

When liquids that may be noxious or hazardous are to be cleaned or removed, dilution such as would be achieved by washing is one option. However, in many cases dilution only leads to a greater volume of liquid which must be handled, without easing the handling at all. In some instances, dilution will only lead to the introduction of an undesirable compound into rivers and lakes, and may account for very undesirable pollution therein. Consequently, other techniques have been developed to provide better handling of such materials. One such approach is to use materials referred to as sorbents. These sorbents will most preferably retain liquid, sometimes at greater mass of liquid than mass of sorbent. The resulting combination of liquid and sorbent may then be handled generally as a solid. One characteristic which is frequently considered to be important then is referred to as sorbency, which for the purposes of this disclosure is calculated as the mass of substance sorbed divided by the mass of the sorbent. It will be understood for the purposes of this disclosure that the alternative spellings "sorbancy" and "sorbency" are understood herein to refer to the same meaning. Furthermore, the selection of the term sorbent, as opposed to absorbent or adsorbent, will also be understood for the purposes of this disclosure to be indicative of the different types of interaction that may occur with a sorbent and compound being sorbed, and may include various chemical, molecular, atomic, or surface interactions as well as simple permeation.

Within the home, needs similar to those of industry have developed over the last few generations. Homes of old were commonly little more than shelters designed to keep out precipitation, but were otherwise generally very open to the external air and environment. Relatively recently, people have found ways to use modern industrial products to seal such dwellings entirely from the exterior. Even air exchanges within a building are often carefully controlled today, to selectively introduce fresh air while minimizing the need for energy used in climate control. Consequently, with the sealing of a home from the exterior environment, the management and control of certain items within a modern house have also required more careful consideration, and bear many of the same needs as the cleaning and disposal of commercial and industrial wastes or by-products. One common household product which utilizes sorbents to capture and simplify waste disposal is animal litter. The handling of other liquids and waste products within a home or building present challenges and issues much like those of industry. Consequently, for home and commercial application as well as industry it is desirable to have suitable sorbents available.

The selection of base material for the manufacture of sorbents has historically been driven primarily by cost. When a source material was identified that had ready availability and low cost of production, such material stood a good chance of acceptance in the marketplace. Consequently, early sorbents were manufactured from materials such as clay and sand that could be dug from the earth with large scoops or shovels, and which required very minimal processing to be ready for use as a sorbent. Clay offers significant flexibility with the waste being sorbed, being able to sorb both water and oil-based liquids. Sand offers ready separation of liquids from solids, and is easily used to cover up or hide wastes. Since both materials are naturally occurring, returning these materials to the ground does not alter the ecological balance in any way. Furthermore, both materials are capable of withstanding very high temperatures, so where either pre- or post-processing of the sorbent using heat is desired, these materials have been desired.

In order to remain cost competitive, other materials that were identified as sorbents were selected from various underutilized materials that might otherwise have been thought of as waste streams themselves. One example is the use of cellulose-fiber based sorbents, utilizing many different sources such as wood, corn and other agricultural stalks collectively referred to as straw, and the like. The use of such cellulose-fiber based sorbents has been particularly common throughout recorded time in the handling of agricultural waste, such as bedding for cows, horses and other livestock. The cellulosic agricultural waste products such as grain stalks are quite low in nitrogen, and proportionately high in carbon. As a result, these materials have, by themselves, tended to be difficult to biologically degrade either naturally or through ordinary composting processes. Nevertheless, the cellulose fibers act like wicks, and so are able to sorb significant amounts of liquid. When these liquids are high-nitrogen compounds such as animal wastes, the resulting fiber-and-waste combination is actually quite balanced in carbon and nitrogen, and so is readily composted and returned to the soil as a desirable soil amendment.

Consequently, for many years sorbents were manufactured almost entirely from clay, straw and cellulosic fiber as the primary ingredient. These materials still today provide suitable characteristic for many applications. However, since the introduction of commercial cat litter more than half a century ago, much development has been made in the field of sorbents which has had direct bearing on both home and industrial application.

Original cat litters were manufactured from various clays or sand compositions. Since then, litter compositions have become far more intricate and sophisticated, frequently including many different additives that are designed to enhance or introduce particular desired characteristics while minimizing other undesired attributes. Among the desired characteristics are sorbency, clumping, minimal expansion during liquid retention, odor masking or neutralizing, low bulk density, animal attractiveness, moderate textures, bio-compatibility, sewer and septic compatibility, and renewability. Undesirable characteristics include dusting, tracking or otherwise clinging to animal paws or fur, microbial growth, toxicity, wicking through the bulk after clumping, and clump friableness.

Since no material has been found to have all of the desired characteristics and none of the undesirable characteristics, the approach more recently has been to compose "designer" formulations that have additives and ingredients to optimize the specific features or characteristics that are desired in a given composition. These "designer" formulations may then be applied not only to households for cat and other small animal litters, but to many diverse applications requiring the use of sorbents. Unfortunately, this mixing of ingredients requires more technical savvy in the formulation and manufacture of a product, and associated higher cost. Furthermore, bio-compatibility, chemical interactions, and toxicity are much more difficult and complex to assess as additional ingredients and additives are mixed into any formulation, since there is always a potential for unexpected and undesired interactions.

More recently, attention has begun to shift from the clay and sand based compositions for household animal litters to various agricultural waste products. While cat litter is not as a rule composted, due to health concerns, the ability to flush the waste litter into a household septic system is desirable. Agricultural products tend to be more bio-compatible with the septic system. Furthermore, sand and clay-based products are also much more dense than the agricultural counterparts, and so are more inconvenient to transport by either the merchants or the homeowner. As more studies are conducted, various agricultural products are also thought to be safer and better for the animals as well. For example, it is felt that the clay compositions, when either eaten or inhaled by the animal, produce negative consequence. This is of particular concern as more complex ingredients are compounded with the clay to enhance desired characteristics. In contrast, most agricultural products may be eaten with little if any health concern.

As a result of the benefits of using agricultural products as sorbents, much research and development has been conducted with regard thereto. To illustrate this point adequately, the following United States patents are referenced, the relevant teachings of which are incorporated herein by reference. In U.S. Pat. No. 3,983,842 by Marion et al, entitled "Peanut hull animal litter", the inventors describe grinding and pelletizing peanut hulls for making animal litter, adding other ingredients to improve clumping and help odor absorption. U.S. Pat. No. 4,206,718 by Brewer, entitled "Animal litter process," describes a process of manufacture and materials therefor including various gelatinizable plant flours. U.S. Pat. No. 4,217,858 by Dantoni, entitled "Method of making animal litter," describes grinding, separating inner and outer hull parts, and treating then pelletizing peanut hulls for litter making. U.S. Pat. No. 4,258,660 by Pris et al, entitled "Animal litter composition," describes a litter composition including straw, grain, grass, sunflower hulls, alfalfa, and binder. U.S. Pat. No. 5,041,410 by Ivie, entitled "Method of processing peanut hulls," describes the crushing and pelletizing of peanut hulls to make pesticide and fertilizer carriers, and moisture absorbent material. U.S. Pat. No. 5,067,984 by Starr, entitled "Oil absorbent," describes a flour and mustard paste product for absorbing oil. U.S. Pat. No. 5,109,804 by Chikazawa, entitled "Coated animal litter," describes popping cereal grains, tapioca, sweet potato, and white potato, and treating the puffed material with various chemicals to produce a litter material. U.S. Pat. No. 5,152,250 by Loeb, entitled "Agglomerating biodegradable animal litter and method of manufacture," describes a mixture of ground peanut hulls and grain flour with an oil adherent to prevent dusting for use as a clumping litter material. U.S. Pat. No. 5,209,185 by Chikazawa, entitled "Artificial litter for pets comprising tapioca," describes using food grade tapioca or tapioca/corn expanded pellets coated with zeolite and with other agents for scent, color, and chemical preservation. U.S. Pat. No. 5,215,041 by Krahenbuhl, entitled "Method for the manufacture of animal litter and animal litter," describes the use of industrial fiber and household waste processed to make animal litter. U.S. Pat. No. 5,216,980 by Kiebke, entitled "Hydrating cat litter and litter additive," describes a grain granule kitty litter, and may include clay, scent, and oil additive. U.S. Pat. No. 5,219,818 by Ivie, entitled "Method of processing peanut hulls and peanut hull granule product," describes grinding and pelletizing peanut hulls for use "as carriers of chemical agents and as moisture absorbent materials for use in various industrial processes." U.S. Pat. No. 5,229,348 by Ivie, entitled "Animal litter granules and method of processing peanut hulls in producing cat litter," describes crushing peanut hulls, then compressing them into granules and adding other ingredients for good smell and to prevent mold, for use as cat litter. U.S. Pat. No. 5,266,547 by Wollrich, entitled "Diatomaceous earth containing adsorbent, method for making, and methods of use thereof," describes a mix of vinegar, diatomaceous earth, and sugar for oil absorption. U.S. Pat. No. 5,448,967 by Ryan, entitled "Product for deodorizing and sanitizing horse stalls, and to a process of making the product," describes a mixture of cereal grains, and kelp that is fermented to produce enzymes helpful in reducing odor, then added to diatomaceous earth to make a sanitizing powder. U.S. Pat. No. 5,605,114 by Peltenburg et al, entitled "Absorbent material comprising dried vegetable pulp and its use for treating organic waste," describes the use of dried extraction pulp, such as beet, chicory root, or Jerusalem artichoke tuber, to make cat litter and other absorbing materials. U.S. Pat. No. 5,690,052 by Sladek, entitled "Method for sorbing liquid using ground wheat grain litter," describes a ground cereal grain litter that absorbs and clumps. U.S. Pat. No. 5,975,018 by Otoguro, entitled "Discharged urine or other waste fluids processing material for pet animals," describes a pellet made of "a wide variety of pulps (virgin pulp, old paper pulp, pulp residue passed through a paper-making mesh in the paper-making process, or paper-making sludge whose content of inorganic filler such as calcium carbonate is appropriately adjusted), paper powder, sawdust, wood powder, bean-curd refuse, rice hulls, coffee bean hulls, coffee been residue, tea hulls, activated carbon, and the like". U.S. Pat. No. 6,014,947 by Sladek et al, entitled "Ground grain animal litter," describes a ground grain litter material described as being suitable for sorbing any aqueous liquid. Milo is introduced to reduce dusting. U.S. Pat. No. 6,098,569 by Kent et al, entitled "Animal litter, process for preparing animal litter, and method for removal of animal waste," describes the use of grain germ (corn germ was discussed and used in examples) and other ingredients to make animal litter. U.S. Pat. No. 6,216,634 by Kent et al, entitled "Animal litter, process for preparing animal litter, and method for removal of animal waste," describes grain-germ based (preferable corn) clumping animal litter. U.S. Pat. No. 6,220,206 by Sotillo et al, entitled "Method for producing a cat litter from grain milling byproducts," describes the use of grain milling waste products to manufacture litter pellets. U.S. Pat. No. 6,568,349 by Hughes et al, entitled "Ground grain animal litter," patent describes pelletized or crumbled ground grain and wood mix litter. U.S. Pat. No. 6,817,315 by Tsengas et al, entitled "Cat litter," describes use of spent distiller's grain for making litter. U.S. published applications 2003/0020043 and 2004/0086541, each by Barresi et al and entitled "Biodegradable sorbents," discuss spent grain sorbents. As can be appreciated from the foregoing, prior artisans have contemplated such diverse agricultural by-products as spent distiller's grain, peanut hulls, saw dust, and beet pulp.

In addition to the foregoing, some prior artisans have also contemplated the use of various bean and grain products. The following U.S. patents are incorporated herein by reference as being exemplary of such attempts and knowledge. U.S. Pat. No. 5,230,305 by House, entitled "Scoopable cat litter and method," describes a litter material made of "farinaceous material" including seeds, tubers, and roots, with cereal grain specifically focused on. U.S. Pat. No. 5,361,719 by Kiebke, entitled "Biodegradable hydrating cat litter," describes a litter composition including use of pulse crops as one component. It further addresses adding cat-attractant scent. U.S. Pat. No. 5,526,770 by Kiebke, entitled "Biodegradable dustless cat litter," describes the use of pulse crops and beans for use as a base in making cat litter. It is not specific in the type of beans being addressed. U.S. published application 2003/0004479 by Ueda, entitled "Water-absorbing agent composition and method for production thereof, absorptive article and absorbing material," describes compositions for super-absorbent materials as might be used in diapers or sanitary napkins, and includes among the possible ingredients "adzuki, licorice, broad beans, and soybeans". U.S. Pat. No. 4,727,824 by Ducharme et al, entitled "Absorbent composition, method of making and using same," describes a composition for pet litter or for absorbing aqueous or oleophilic materials. The text repeatedly addresses use of soybeans and in the summary of the invention describes "protein from bean or seed sources such as soybean or flaxseed and the like also provide suitable binders". U.S. Pat. No. 4,883,021, also by Ducharme et al, entitled "Absorbent composition," describes a composition for pet litter or for absorbing aqueous or oleophilic materials. Soybeans and protein from bean or seed sources such as soybean or flaxseed and the like are described. U.S. Pat. No. 5,207,830 by Cowan et al, entitled "Lightweight particulate cementitious materials and process for producing same," describes a foamed cementitious material that may contain guar or locust bean gum among other similar materials to provide cohesiveness and clumping when wetted by urine or similar liquids. U.S. Pat. No. 5,801,116 by Cottrell et al, entitled "Process for producing polysaccharides and their use as absorbent materials," describes the use of locust or guar bean gum as a component of a manufactured absorbent material. U.S. Pat. No. 6,287,550 by Trinh et al, entitled "Animal care system and litter with reduced malodor impression," describes the composition of an organic litter including "Protein such as gluten found in wheat flour, or protein from bean or seed sources such as soybean or flaxseed and the like also provide suitable binders." Only soybeans are mentioned by name. U.S. Pat. Nos. 6,405,677, 6,622,658, and 6,868,802 each by McPherson et al and entitled "Animal litter, process for preparing animal litter and method of removal of animal waste," describe an animal litter using seed material including soybeans and soy bean meal, and addresses addition of cohesiveness agents to improve clumping. U.S. published application 2003/0205204 by Wang et al, entitled "Animal litter, process for preparing animal litter, and method for removal of animal waste," describes the use of "meals or flours from grain, beans, grass, and the like, which are typically thought of as agriculturally derived meals or flours" in compacted cohesive animal litter. Soybeans are the only specifically mentioned member of the beans described therein. U.S. published application 2004/0157734 by Mertens et al, entitled "Supersuperabsorbent polymers, preparation thereof and use thereof," describes the use of carob, guar, or locust bean flour as a component of a hydrogel absorber. Finally, U.S. Pat. No. 5,021,390 by Hatton, entitled "Liquid hydrocarbon absorbent composition and method," describes an absorbent system that does not absorb water, but readily absorbs oils and greases even from water surfaces, using guar bean, linseed, locust bean and other related leguminous plant seeds.

Clearly, a very substantial amount of research and development effort has been invested in the development of better sorbents using economically effective agricultural by-products. Nevertheless, these materials have heretofore been first a by-product, with less-than-desirable performance.

Performance enhancing additives are commonly compounded therewith, to better serve the needs of the sorbent marketplace. Heretofore, there was not a good ability to optimize the performance directly, while using the economically effective agricultural by-products. What is desired then is a base composition or ingredient which offers as many of the desired features as possible with as few of the undesired features, and which thereby reduces or eliminates the need for additional additives and the consideration of complex or unanticipated interactions. Most preferably, a modern sorbent will additionally permit handling with as little special precaution or consideration as possible.

SUMMARY OF THE INVENTION

Exemplary embodiments of the present invention solve inadequacies of the prior art by providing a sorbent formulated from a specific species of bean, *Phaseolus vulgaris* L., or equivalents thereto. These beans are more commonly known of as dry edible beans, or field beans, and come in a wide variety of market classes. Among these are kidney bean, navy bean, pinto bean, and black bean, which, although differing in the size and coloring of the seed, are all different types of this single species. The sorbent may be used as a tackifier, animal litter, or industrial, commercial or home sorbent.

In a first manifestation, the invention is an improvement to a process for collection, agglomeration and removal of animal waste using an animal litter. In the process, animal waste contacts a litter, causing the litter to agglomerate. The agglomerated litter is then removed from a remainder of said animal litter, typically by sifting. The improvement comprises using as litter a modified natural product consisting essentially of the species *Phaseolus vulgaris* L.

In a second manifestation, the invention is an aqueous sorbent, comprising an organic compound having more than 2 percent by weight total sugar, more than 15 percent by weight fiber, more than 20 percent by weight protein, and less than 10 percent by weight lipid.

In a third manifestation, the invention is a high nitrogen content tackifier suitable for hydro-seeding and other application, consisting essentially of beans of the species *Phaseolus vulgaris* L.

In a fourth manifestation, the invention is a high nitrogen content tackifier suitable for hydro-seeding and other application, comprising an organic compound having more than 2 percent by weight total sugar, more than 15 percent by weight fiber, more than 20 percent by weight protein, and less than 10 percent by weight lipid.

OBJECTS OF THE INVENTION

A first object of the invention is to provide a sorbent which has high sorbency. A second object of the invention is to provide a sorbent which has excellent clumping, with low clump friability and minimal wicking through the bulk after clumping. Another object of the present invention is to provide a sorbent which has minimal expansion during liquid retention. A further object of the invention is to provide a sorbent which has low bulk density. Yet another object of the present invention is to provide a sorbent which has animal attractiveness, such that the sorbent will be well-suited for use as an animal litter. An additional object of the invention is to provide a sorbent which has bio-compatibility, sewer and septic compatibility, and renewability. An even further object of the invention is to provide a sorbent which has moderate textures, with minimal dusting, tracking or clinging to animal paws or fur. Another object of the invention is to provide a sorbent which in non-toxic, and which either prevents or only minimally supports microbial growth. Yet another object of the invention is the provision of a sorbent which fulfills the foregoing objectives through a base composition or ingredient which offers as many of the desired features as possible with as few of the undesired features, and which thereby reduces or eliminates the need for additional additives and the consideration of complex or unanticipated interactions. Most preferably, the invention will additionally permit handling with as little special precaution or consideration as possible.

DESCRIPTION OF THE PREFERRED EMBODIMENT

The present inventors have discovered that various beans of the particular species *Phaseolus vulgaris* L., including but not limited to kidney beans, navy beans, pinto beans, and black beans, have a natural combination of characteristics that provide the benefits and features that are sought after while avoiding the undesirable characteristics, with little if any additives required. According to the preferred embodiment, navy beans have been have this desired natural combination of characteristics. Furthermore, little processing is required for these beans to deliver the desired characteristics and objectives, other than shaping.

These beans do not have to be of commercial food quality. Instead, to remain economically competitive, they may preferably comprise cracked or otherwise deformed or defective beans that might otherwise be considered to be waste for ordinary retail or wholesale trade. Such beans are often referred to as culls, having been specifically separated from the commercial or retail grade product.

In the preferred embodiment, the beans, in this embodiment navy beans, may be pelletized, or pelletized and then subsequently crumbled. The process may include grinding or otherwise comminuting to a relatively smaller size, and may additionally include the control of moisture levels, either by the introduction of small amounts of moisture prior to pressing or by further drying and dehydration. The pellets may be delivered to sale as produced, or the pellets may be used as a source feed for additional milling, crumbling or grinding to reduce the size of the pellets. The resulting product forms a superior sorbent, having the additional benefit of superior clumping over prior art sorbents.

While not wishing to be bound by any theory, the benefit and advantages that are derived from beans of the particular species *Phaseolus vulgaris* L. are believed to be a result of the relatively low oil content, high protein content, and extremely high fiber and sugar content. For the purposes of the present disclosure, sugars are defined as the sum of mono- and disaccharides, while carbohydrates include higher oligosaccharides and available starches. Higher oil levels are known to interfere with sorbency. Consequently, the selection of an oil bean such as soybeans for the primary ingredient is very undesirable, and would be quite ineffective for sorbing water-based liquids, owing to the higher oil content. Higher protein levels are associated herein with improved clumping and low friability of the resulting clump. Consequently, while beans of the particular species *Phaseolus vulgaris* L., including in particular navy beans, have been identified herein as having characteristics superior to any previously known and identified base material used in litters and the like, other beans and potentially other mixtures having composition similar to or providing the efficacy of the navy bean will be understood to be included herein, the identification which may be made using suitable analytical and assay apparatus and techniques in light of the information presented throughout the present disclosure.

While generally less preferred, as aforementioned, other ingredients or additives may be combined with appropriately processed bean sorbent to form an animal litter composition or other sorbent. Among these additives are scents, deodorizers, additional organic or inorganic sorbents already known in the art, animal attractants, anti-dusting compounds, various clumping additives, preservatives and other ingredients too numerous to specifically mention herein. While the present invention generally eliminates or greatly reduces the need for additives, it will be understood that the mere incorporation of these designer additives is still contemplated herein and such use will, with appropriate compounding, not eliminate the many benefits and advantages intrinsic to the base material, such as the navy bean, presented herein.

In use, the present bean compositions offer much benefit and advantage over prior art clay-based litters. While other litters are known, including fiber and grain-based litters, the clumping characteristics of clay continue to attract many consumers. Bentonite clays typically are capable of forming relatively large and durable clumps, which makes scooping of a litter box an easy task. Furthermore, the newer automatic litter boxes require the use of clumping litter in order to operate properly. Nevertheless, clay litters tend to dust, and the clumps could be of better size and durability. Furthermore, clay-based litters are generally incompatible with most composting techniques and methods, consequently requiring undesirable consumption of landfill space.

In contrast, the preferred bean litters have been determined to offer superior clumping, achieving a combination of better size and durability than other sorbents, while virtually eliminating the dusting problems and also permitting waste processing through either standard aerobic or anaerobic composting techniques. In fact, the preferred bean litters provide a valuable source of nitrogen and other fertilizer components, which can be highly beneficial to many composting systems.

Where used as a small animal litter, beans additionally act as an animal attractant, providing inherent characteristics that are welcomed by a cat or other animal. Owing to the non-toxic and readily digestible nature of the product, accidental ingestion which may occur during grooming or the like will not harm the animal or interfere with the animal's proper digestion. With proper manufacturing technique, the number of fines in the liter may be maintained at a relatively lower rate, to reduce or eliminate dusting.

EXAMPLES

For proper comparison between various sorbents, major constituent differences were identified by comparing protein, fiber, sugar, and starch. Products were used in test procedures which contained higher and lower percentages than the most preferred navy beans in each of the major constituent categories. The analyses of products used for comparison testing are listed in the following Table I, the data which was obtained through various commercial and governmental sources.

TABLE I

| INGREDIENTS | Dry Matter % | Crude Protein % | Crude Fat % | Crude Fiber % | Sugar % | Starch % |
| --- | --- | --- | --- | --- | --- | --- |
| Navy Bean | 86.6 | 25.1 | 1.44 | 24.4 | 5.4 | 34 |
| Wheat, HRS | 88 | 13.5 | 1.9 | 3 | 0.8 | 56 |
| Corn, yellow | 87 | 7.9 | 3.5 | 1.9 | 0.3 | 55 |
| Corn gluten meal 60% | 90 | 60 | 2 | 2.5 | unavail. | unavail. |
| Soybean meal 44% | 90 | 44 | 0.5 | 7 | unavail. | unavail. |
| Soybean hulls | 91 | 12.1 | 2.1 | 40.1 | unavail. | unavail. |
| Sugar beet pulp | 91.5 | 8.4 | 0.64 | 16.6 | 8.75 | unavail. |

Example I

Navy beans, wheat, soy hulls, beet pulp, and corn gluten were all pelleted on a California Pellet Mill, Master model using a 5/32" diameter die with an 8:1 compression. Pelleting temps remained under 180 degrees Fahrenheit. Products were then crumbled and sieved to a −No. 5 to +No. 30 size. This resulted in non-bias and equal comparisons in regard to physical characteristics.

Example II

A sorbent performance test was conducted on the products of Example I, following ASTM 726 9.3.2. The results are listed in the following Table II.

TABLE II

| | Sorbent Testing ASTM 726 | | | | |
| --- | --- | --- | --- | --- | --- |
| Material | Start Wt. (g) | Ending Wt. (g) | Sorbed | g/g sorbed | Sorbed % |
| Navy bean crumble | 25.25 | 66.63 | 41.38 | 1.64 | 164% |
| Wheat crumble | 23.95 | 52.49 | 28.54 | 1.19 | 119% |
| Soy hull crumble | 25.05 | 156.29 | 131.24 | 5.24 | 524% |
| Beet pulp crumble | 25.18 | 148.43 | 123.25 | 4.89 | 489% |
| Corn gluten crumble | 25.3 | 46.81 | 21.51 | 0.85 | 85% |
| Navy bean crumble | 25.16 | 68.33 | 43.17 | 1.72 | 172% |

**Not A Gelatinized Pellet

As shown in Table II, products with high fiber had the greatest sorbent capabilities. Wheat with a high starch content and corn gluten with high protein content did not have comparable water sorbency.

Example III

A loose particle clump test was performed on four of the crumbled products used for the sorbent test. The testing included filling eight inch diameter Pyrex containers with 2.5 inches of crumbled product. Water was then added to the surface of these products, 5 ml per test which is equivalent to 6.74 grams of water. The clumps were allowed to set for six and eighteen hours. Evaluation was done on clump weight and hardness of the clump. Testing was replicated.

The clumps were removed at six hours, weighed and placed under a Dillon® Quantrol™ force tester. Fracture/yield results were taken after 1½ turns without a change in force pressure.

After six hours, the navy bean crumble was the only product which could be removed intact for testing; all the other products crumbled or fell apart upon removal. The navy bean clump had a hardness of 0.74 pounds of force with a point tip test before fracturing.

Example IV

Force testing was repeated at 12 hours. Once again the navy bean clump was removed and tested, now having a fracture point of 1.51 pounds of force with a tip point. The soy hulls clump was also removable at 12 hours with a break point of 0.02 pounds of force while the gluten and beet pulp clumps would not remain intact for testing.

Example V

The clump test was repeated using navy bean cull, yellow corn, sugar beet pulp, soybean meal 44%, soybean hulls, and corn gluten. Each stock material was formed into pellets as in Example I, and ground on an Urshel Comitrol using a 0.004 inch cutter for uniformity in particle size for testing. The results are shown in Table III.

TABLE III

| | Material Clumping Test Five minute exposure time. | | | | |
| --- | --- | --- | --- | --- | --- |
| Material | Start Wt. (g) | Ending Wt.(g) | Difference | g material/ g of water | Clump hardness |
| Navy bean | 6.74 | 21.3 | 14.56 | 2.16 | .68 lbs. |
| Corn, yellow, mature | 6.74 | 20.33 | 13.59 | 2.02 | .44 lbs. |
| Sugar beet pulp | 6.74 | 10.17 | 3.43 | 0.51 | Not intact |
| Soybean meal | 6.74 | 18.31 | 11.57 | 1.72 | .54 lbs. |
| Soybean hulls | 6.74 | 9.59 | 2.85 | 0.42 | .04 lbs. |
| Corn gluten meal | 6.74 | 19.86 | 13.12 | 1.95 | .62 lbs. |

TABLE III-continued

Material Clumping Test
Five minute exposure time.

| Material | Start Wt. (g) | Ending Wt.(g) | Difference | g material/ g of water | Clump hardness |
|---|---|---|---|---|---| a Lower number indicated increase sorbency.

Example VI

Navy beans were compared to various other members of the preferred species *Phaseolus vulgaris* L. The data, taken from a single common recognized governmental resource, is provided below in Table IV.

TABLE IV

|  | Protein | Lipid | Fiber | Sugar | Carbohydrate |
|---|---|---|---|---|---|
| Navy Bean | 22.33 | 1.5 | 24.4 | 3.88 | 60.75 |
| Pinto Bean | 21.43 | 1.23 | 15.5 | 2.11 | 62.55 |
| Kidney Bean | 23.58 | 0.83 | 24.9 | 2.23 | 60.01 |
| Black Bean | 21.6 | 1.42 | 15.2 | 2.25 | 62.36 |
| Soybean | 36.49 | 19.94 | 9.3 | unavailable | 30.16 | values in grams per 100 grams.

From the foregoing examples and tables, navy bean culls and other members of the preferred species *Phaseolus vulgaris* L. with their unique chemical structure have the capability to sorb larger quantities of water over similar materials, specifically wheat and corn gluten. Navy bean water sorbency appears to emanate from the fiber content, present also in beet pulp and soy hulls, both which contain much greater crude fiber levels.

Unlike beet pulp and soy hulls, navy beans also clump and adhere together when exposed to water. Fiber content does not contribute to this characteristic, but rather prevents clumping. Both soy hulls and beet pulp are, for practical purposes, non-clumping, and would not remain intact while handling. Protein and starch appear to improve clump hardness, yet when corn gluten and soybean meal clumps were placed under pressure, they broke and crumbled. In contrast, the navy bean clump fractured and remained intact.

A comparison with navy beans, wheat and corn as shown herein above in Table I reveals that navy beans have approximately twice the fiber and protein content of either corn or wheat, and between seven and twenty times the sugar content. Both are believed to be highly consequential to the development of both sorbency and clumping when exposed to aqueous compositions. In consideration thereof, it is further contemplated herein that other ingredients may be formulated to provide similar elevated levels of sugar, fiber and protein to emulate the results obtained herein with navy beans. One such composition, in accord with the teachings of the present invention, is an organic compound having more than 2 percent by weight total sugar, more than 15 percent by weight fiber, more than 20 percent by weight protein, and less than 10 percent by weight lipid. Nevertheless, navy beans and other members of the preferred species *Phaseolus vulgaris* L. are most preferred, owing to the ready availability of culls and the ease of fabrication of preferred sorbents as illustrated in the foregoing examples.

As aforementioned, the oil content found in many beans of other species and other crops and agricultural by-products is further recognized by the present inventors to inhibit the desired sorbency of water-based liquids. Soybeans have a total lipid content of approximately 20%. Other common agricultural by-products which are known to act as water repellants have total lipid content of approximately 10%. In contrast, common members of the preferred species *Phaseolus vulgaris* L. have total lipid content in the range of from 0.75-1.5%. Consequently, a total lipid content of less than 10%, more preferably less than approximately 3%, and most preferably less than approximately 2% is desired in the preferred embodiment.

While the foregoing details what is felt to be the preferred and additional alternative embodiments of the invention, no material limitations to the scope of the claimed invention are intended. The possible variants that would be possible from a reading of the present disclosure are too many in number for individual listings herein, though they are understood to be included in the present invention. For example, while the present disclosure is directed primarily towards using navy beans, other beans of the particular species *Phaseolus vulgaris* L., and compounds having similar characteristics to the formulation of clumping animal litter, it will be recognized upon a review of the present disclosure that there are additional commercial and industrial applications where sorbents having the above recited characteristics are highly sought. Exemplary of such applications are water-based spill sorbents, additives commonly referred to as tackifiers such as might be used in hydro-seeding, and binders which assist in the forming of pellets. Consequently, such additional sorbent applications are understood to be incorporated herein, and the benefits and characteristics which are obtained with such application are additionally considered herein. To further describe such benefit, the use of bean cull for hydro-seeding application combines a high nitrogen (protein content in excess of 20%), fertilizer-rich bean with an application where such fertilization is very beneficial. Further, features, design alternatives, processing alternatives with and without heat, pelletizing, and other alternatives that would be obvious to one of ordinary skill in the art are considered to be incorporated also. The scope of the invention is set forth and particularly described in the claims herein below.

We claim:

1. A tackifier suitable for hydro-seeding and other application, comprising an organic compound having more than 2 percent by weight total sugar, more than 15 percent by weight fiber, more than 20 percent by weight protein, and less than 10 percent by weight lipid, wherein said organic compound further consists essentially of beans of the species *Phaseolus vulgaris* L.

2. The tackifier of claim 1 further comprising navy beans.

3. The tackifier of claim 2 further comprising navy bean culls.

4. In combination, a primary active ingredient and a tackifier, said tackifier providing an improved adhesive quality to said primary active ingredient, said tackifier comprising an organic compound having more than 2 percent by weight total sugar, more than 15 percent by weight fiber, more than 20 percent by weight protein, and less than 10 percent by weight lipid.

5. The combination primary active ingredient and tackifier of claim 4, wherein said organic compound further comprises beans of the species *Phaseolus vulgaris* L.

6. The combination primary active ingredient and tackifier of claim 4, wherein said organic compound further consists essentially of beans of the species *Phaseolus vulgaris* L.

7. The combination primary active ingredient and tackifier of claim 6 wherein said organic compound further comprises navy beans.

8. The combination primary active ingredient and tackifier of claim 7 wherein said organic compound further comprises navy bean culls.

9. A tackifier functional in a first minor weight percentage in combination with a primary active ingredient of second major weight percentage greater than said first minor weight percentage, said tackifier providing an improved adhesive quality to said primary active ingredient and comprising an organic compound having more than 2 percent by weight total sugar, more than 15 percent by weight fiber, more than 20 percent by weight protein, and less than 10 percent by weight lipid.

10. The tackifier functional in a first minor weight percentage of claim 9, wherein said organic compound further comprises beans of the species *Phaseolus vulgaris* L.

11. The tackifier functional in a first minor weight percentage of claim 9, wherein said organic compound further consists essentially of beans of the species *Phaseolus vulgaris* L.

12. The tackifier functional in a first minor weight percentage of claim 11 further comprising navy beans.

13. The tackifier functional in a first minor weight percentage of claim 12 further comprising navy bean culls.

* * * * *